Oct. 8, 1957   R. O. BIRCHLER ET AL   2,809,272
APPARATUS FOR SELECTIVELY FORMING AND WELDING
CONTACTS ONTO WIRE SPRING RELAY PARTS
Filed Jan. 31, 1956   7 Sheets-Sheet 1

INVENTORS
R. O. BIRCHLER
R. F. SCHALK
BY C. A. Hamilton
ATTORNEY

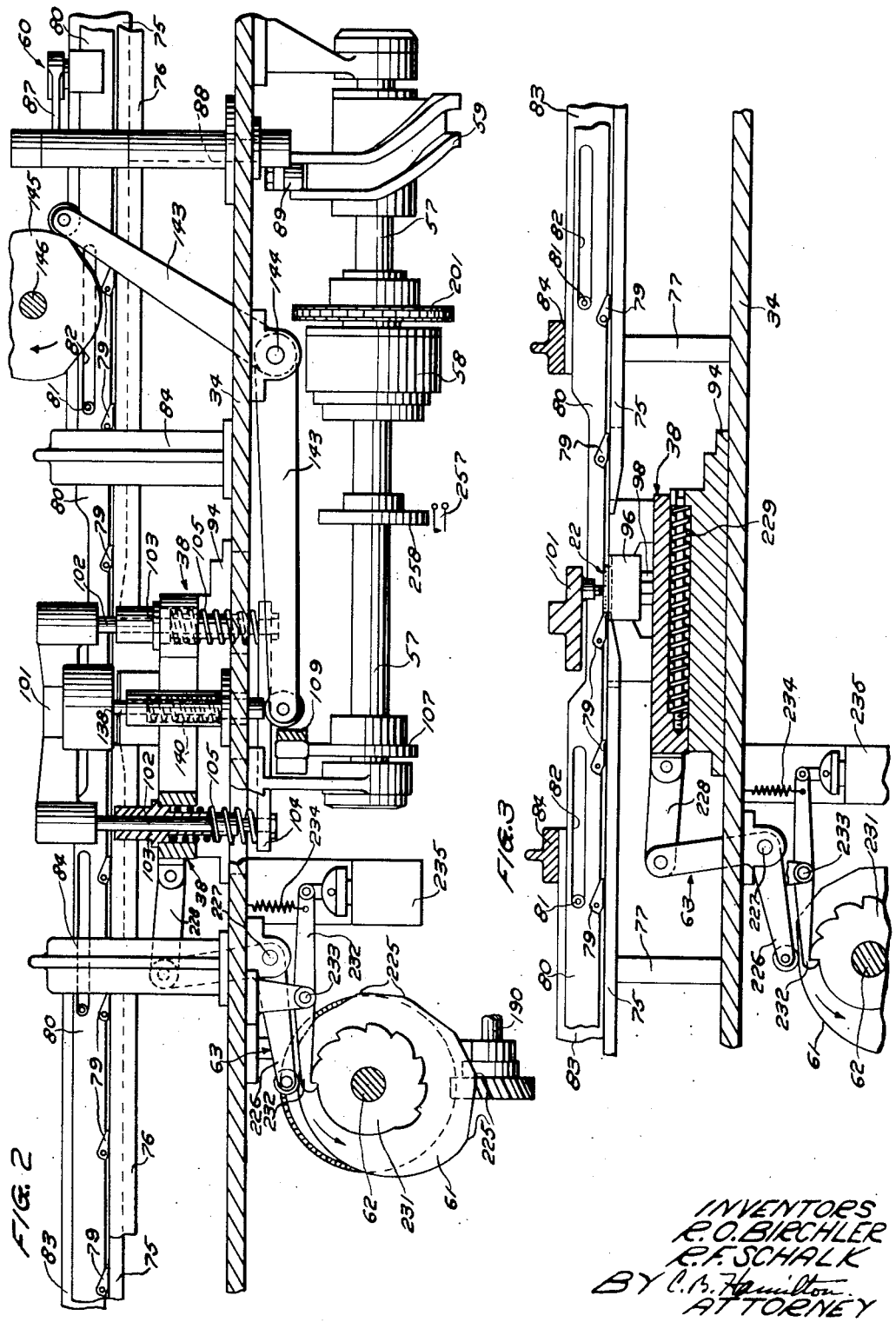

Oct. 8, 1957   R. O. BIRCHLER ET AL   2,809,272
APPARATUS FOR SELECTIVELY FORMING AND WELDING
CONTACTS ONTO WIRE SPRING RELAY PARTS
Filed Jan. 31, 1956   7 Sheets-Sheet 3
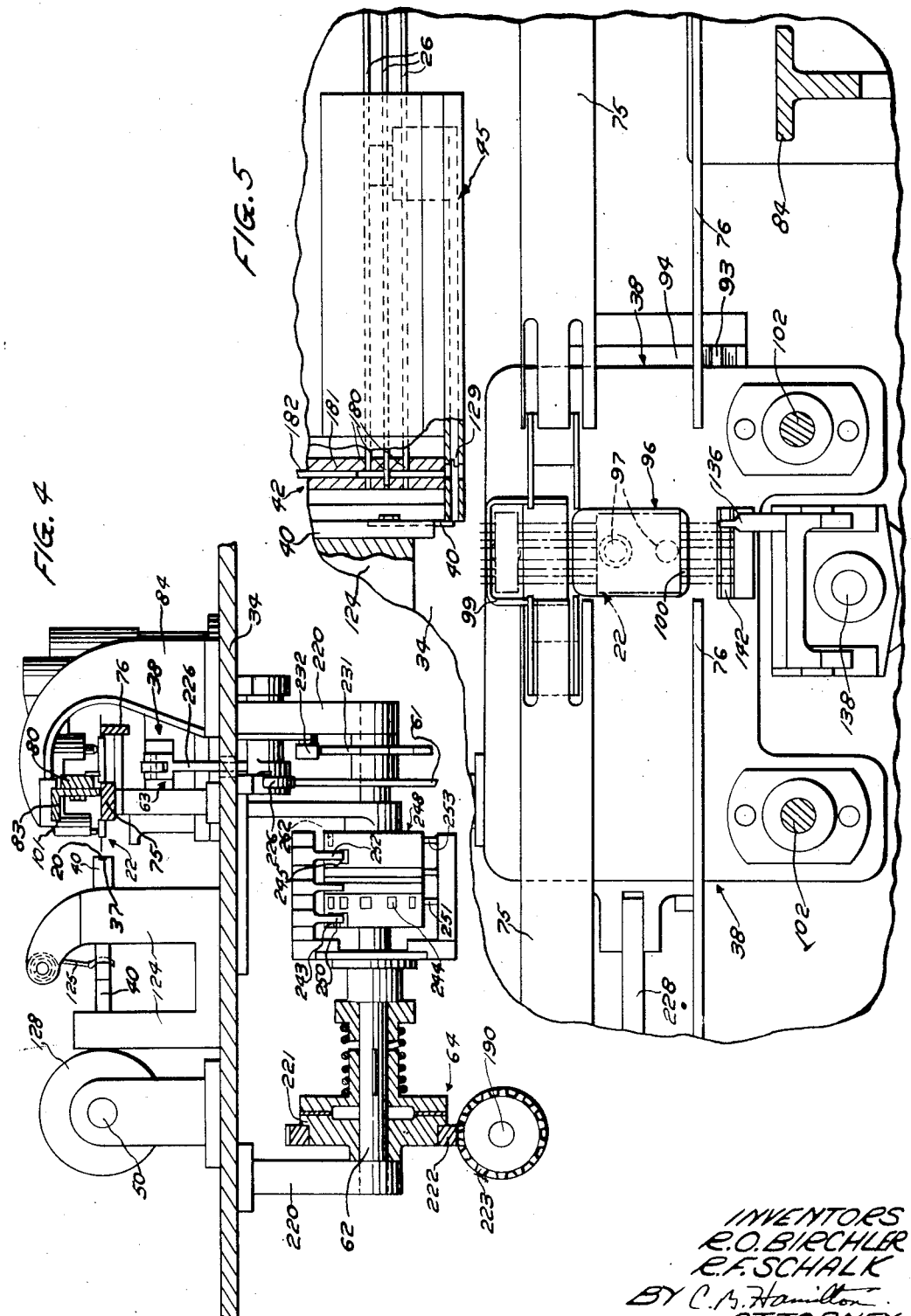
INVENTORS
R.O. BIRCHLER
R.F. SCHALK
BY C.B. Hamilton
ATTORNEY

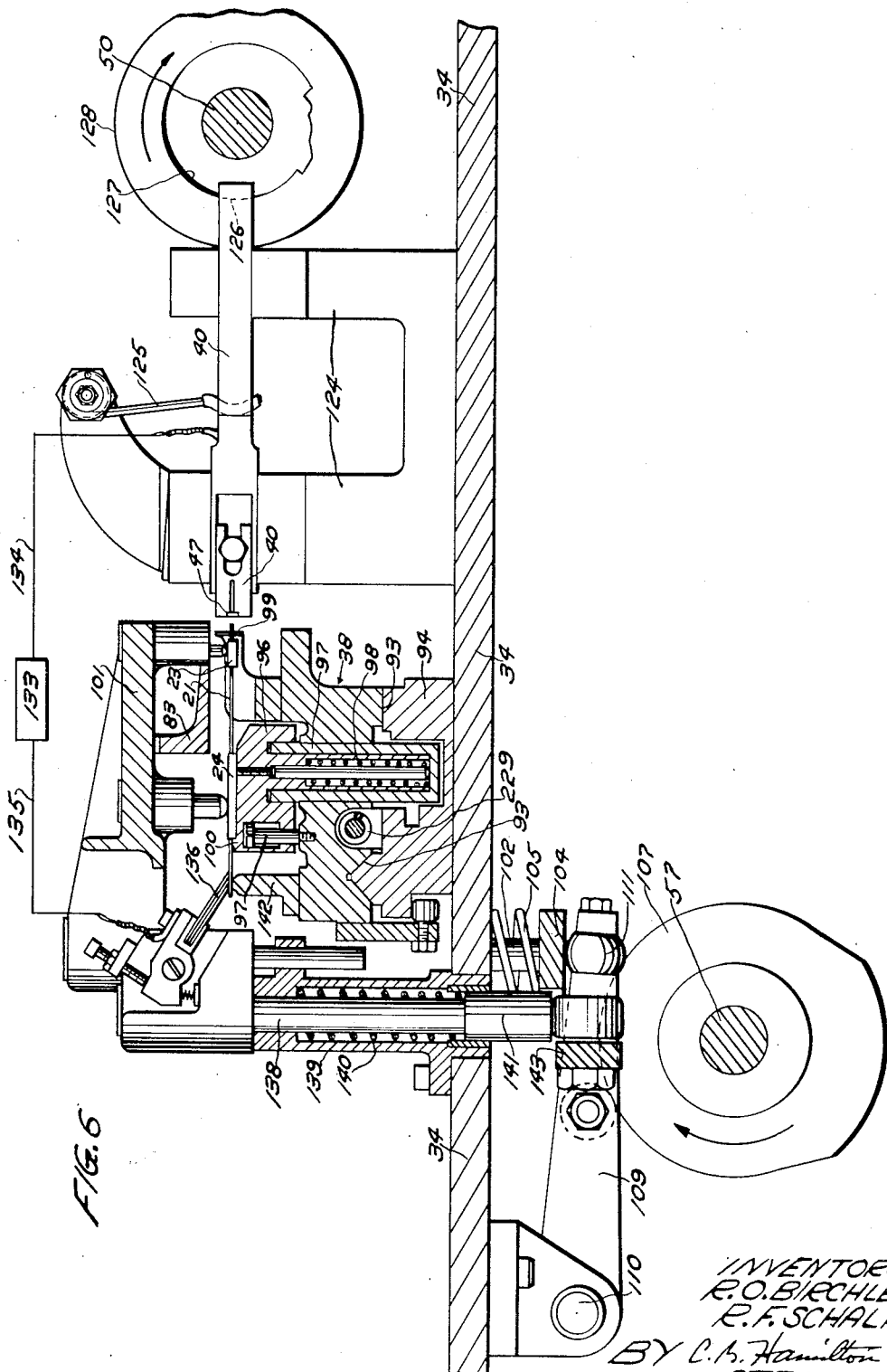

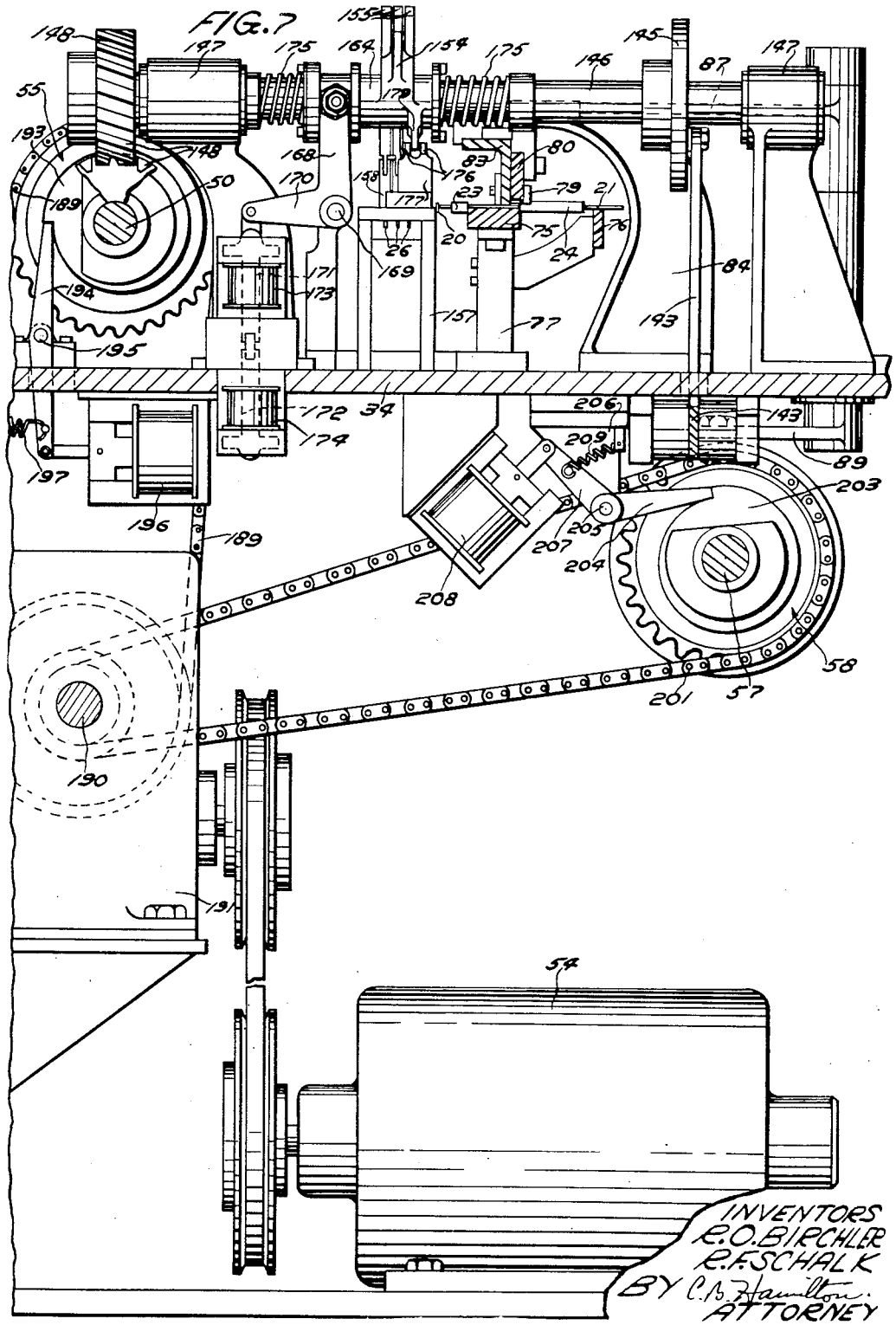

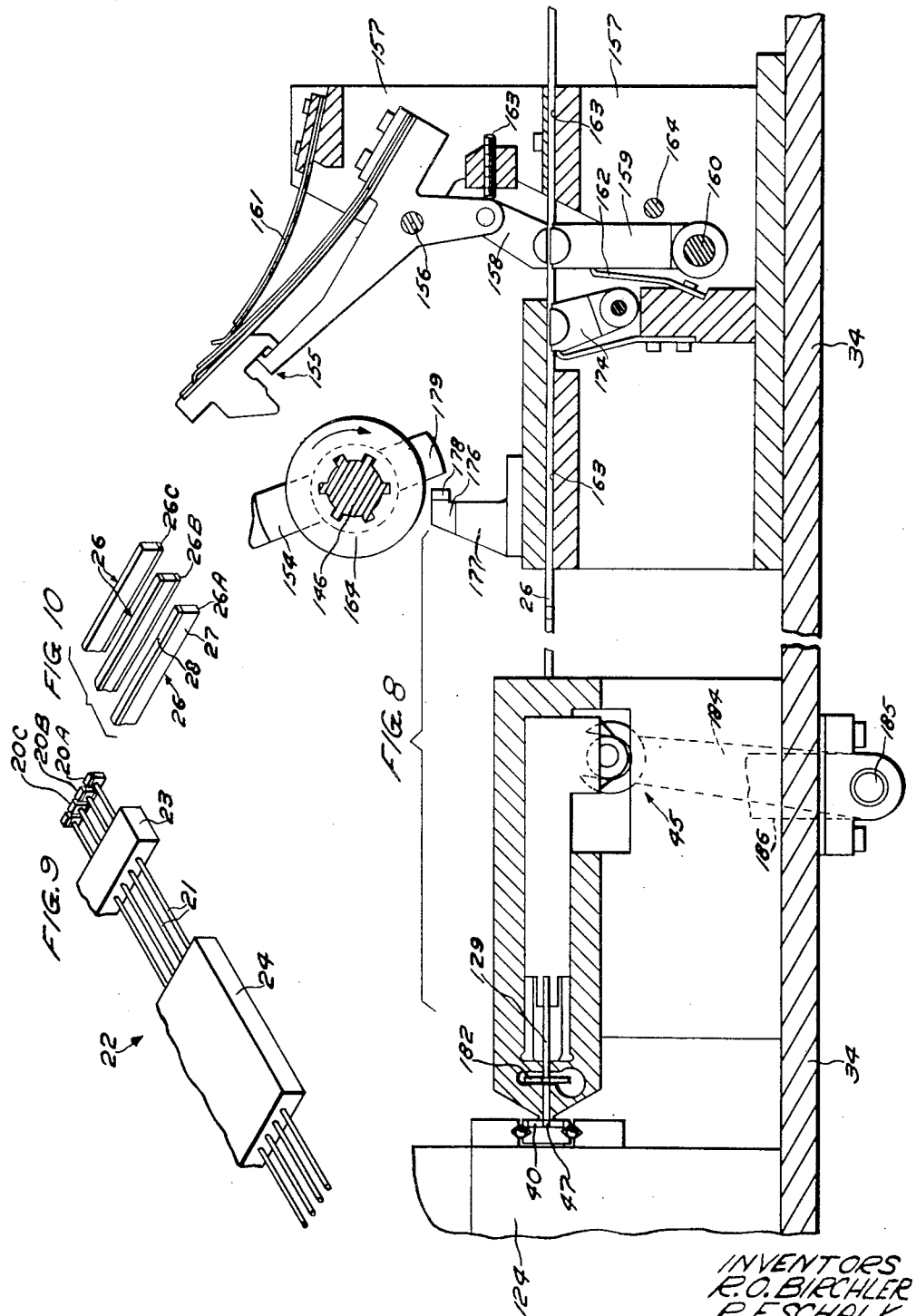

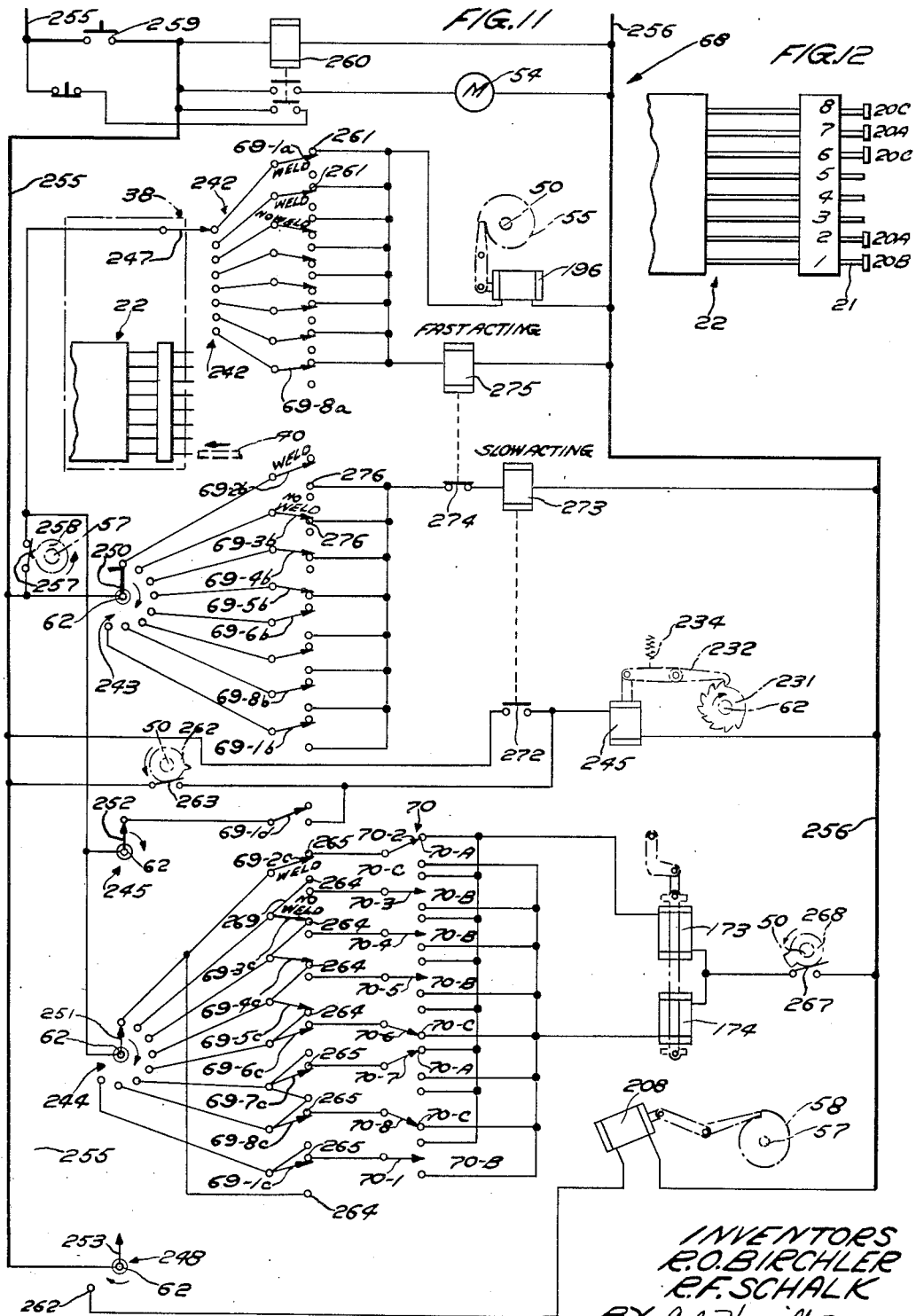

United States Patent Office 2,809,272
Patented Oct. 8, 1957

2,809,272

APPARATUS FOR SELECTIVELY FORMING AND WELDING CONTACTS ONTO WIRE SPRING RELAY PARTS

Robert O. Birchler, Cicero, Ill., and Robert F. Schalk, Madison, Wis., assignors to Western Electric Company, Incorporated, New York, N. Y., a corporation of New York Application January 31, 1956, Serial No. 562,388

12 Claims. (Cl. 219—79)

This invention relates to apparatus for selectively forming various types of contacts and selectively welding these contacts onto selected conductors of a relay part.

This invention is an improvement of the welding apparatus disclosed in the co-pending application, Serial No. 347,335, filed April 7, 1953, now Patent No. 2,749,419, issued June 5, 1956, and is also related to co-pending applications, Serial Nos. 562,387 and 562,405, filed concurrently.

An object of the present invention is to provide an apparatus for forming contacts and selectively welding them onto predetermined conductors of an electrical component.

Another object of the invention is to provide an apparatus for selectively forming different types of contacts and selectively welding them onto predetermined conductors of a relay part.

An apparatus illustrating certain features of the invention may include a tape feeding mechanism for individually advancing a plurality of contact tapes into a tape shearing mechanism for shearing contacts therefrom and moving them into the path of a transfer mechanism for transferring the contacts to a reciprocable welding electrode for moving the contacts individually into impact engagement with a plurality of wires of a relay part positioned in the path of the electrode to effect the percussive welding of the contacts onto the wires. The tape feeding mechanism, tape shearing mechanism, contact transfer mechanism, and the electrode are actuated in a predetermined sequence by a main drive shaft which is driven through a one-revolution cycle under control of a solenoid actuated one-revolution clutch. The relay part is supported on a carrier which is indexed to position successive wires of the relay part in welding position in alignment with the welding electrode by an indexing cam on an indexing shaft which is driven through a continuously rotating friction clutch and is stopped in selected positions by selectively actuated brake means in the form of a ratchet disc fixed to the shaft and a solenoid actuated latch cooperating therewith. Means for supplying a welding current is connected to the welding electrode and to the successive wires aligned therewith in timed relation to the indexing of the carriage for effecting the welding of the contacts to the wires of the relay. The finished relay parts are removed from the carriage and unfinished parts are fed thereonto by a conveyor operated by a shaft which is driven through one cycle of operation under control of a solenoid actuated clutch after the contacts have been welded onto the relay part. The tape feeding mechanism includes three tape feeding devices individually actuated by a cam which is normally aligned with the center tape feeding device and is selectively shiftable into alignment with the other tape feeding devices to render the selected tape feeding device operable. A plurality of tape selecting switches and welding switches are settable to different positions and cooperate with a plurality of commutators mounted on the indexing shaft for setting up various control circuits in response to the indexing of the carriage to the various positions for selectively forming predetermined types of contacts and welding them onto selected wires of the relay part.

Other objects and advantages of the invention will become apparent by reference to the following detailed description and the accompanying drawings illustrating a preferred embodiment thereof, in which Fig. 1 is a fragmentary plan view of the welding apparatus;

Figs. 2 and 3 are fragmentary longitudinal vertical sectional views of the apparatus taken on lines 2—2 and 3—3, respectively, of Fig. 1;

Fig. 4 is a vertical cross-sectional view of the apparatus taken on line 4—4 of Fig. 1;

Fig. 5 is an enlarged fragmentary plan sectional view of the apparatus showing the article supporting carriage and associated mechanism;

Figure 1:
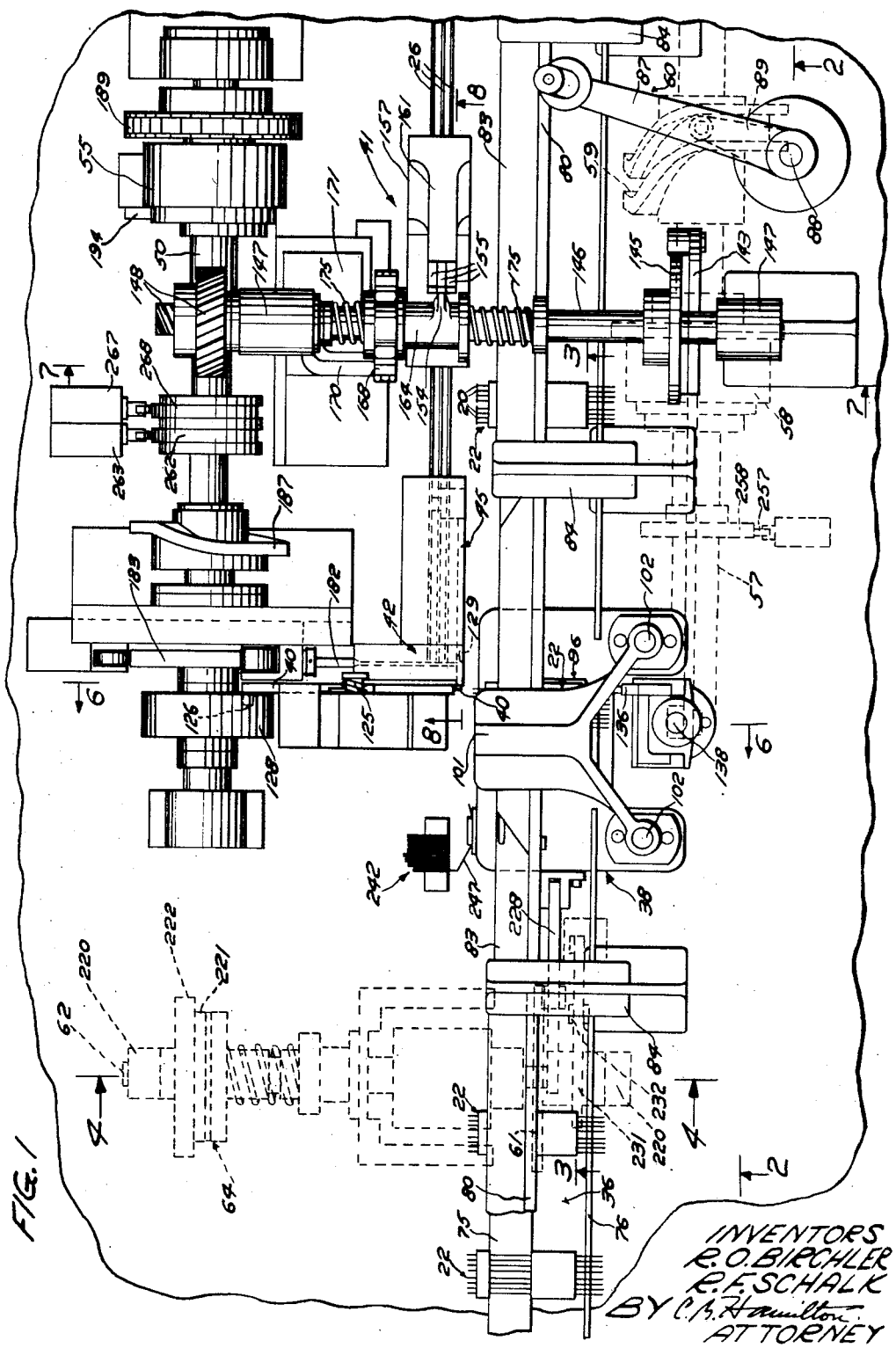

Figs. 6 and 7 are enlarged vertical cross-sectional views taken on lines 6—6 and 7—7 of Fig. 1;

Fig. 8 is an enlarged fragmentary vertical longitudinal sectional view of the apparatus taken on line 8—8 of Fig. 1;

Fig. 9 is a fragmentary perspective view of a relay part or article having a plurality of wires with contacts welded thereto by the apparatus of the present invention;

Fig. 10 is an enlarged fragmentary perspective view of three different types of contact tapes from which contacts may be formed;

Fig. 11 is a schematic view of the electrical control system of the apparatus for selectively welding contacts onto the wires of the article; and Fig. 12 is a fragmentary plan view of a relay part or article showing contacts welded onto selected ones of the wires.

The present welding apparatus is designed for selectively welding contacts 20 onto the ends of all or selected wires 21 of a relay part or article 22 (Fig. 9). The wires 21 are disposed in a row in parallel and laterally spaced relation to each other and are secured in molded blocks 23 and 24 of dielectric material. The contacts 20 are sheared from tapes 26 of metal comprising a body 27 of base metal such as cupro-nickel and a cap or layer 28 of precious metal such as palladium bonded thereto. The tapes and contacts are of three types, 26–A, 26–B, 26–C, one with the cap 28 bonded onto the bottom, one with the cap bonded onto the top, and one with the cap bonded onto top and bottom.

Generally, the apparatus comprises a frame having a horizontally disposed base plate 34 (Fig. 1) on which the various components are mounted, including a conveyor 36 for intermittently advancing the articles 22 individually onto a carriage 38 on which the article 22 is clamped with the first wire 21 thereof in welding position in alignment with a movable electrode or gun 40 (Figs. 5 and 6) for welding a contact 20 thereon. The tapes 26 are individually and selectively advanced by a tape feeding mechanism 41 into a tape shearing mechanism 42 which shears a contact 20 therefrom, which contact is carried by a transfer mechanism 45 into a notch 47 in the electrode.

The electrode 40 is operatively connected to and actuated by a main drive shaft 50 which is driven from a motor 54 (Fig. 7) through means including a solenoid actuated one-revolution clutch 55. The selective tape feeding mechanism 41, the contact shearing mechanism 42, and the contact transfer mechanism 45 are also operatively connected to and actuated by the main drive shaft 50, whereby when the clutch 55 is tripped, the main drive shaft 50 is driven through one revolution and actuates the welding electrode 40, the selective tape feed mechanism 41, the contact shearing mechanism 42, and the contact transfer mechanism 45 in a predetermined sequence. A second shaft 57 is driven from the motor 54 through means including a solenoid actuated one-revolution clutch 58, and the conveyor 46 is operatively connected to and actuated by the shaft 57 through a cam 59 and linkage 60 to remove from the carriage the finished article 22 with the contacts 20 welded thereon, and to feed another unfinished article 22 onto the carriage.

The carriage 38 is advanced to place successive wires 21 of the relay part 22 into welding position in alignment with the electrode 40 by an indexing cam 61 fixed to an indexing shaft 62 and operatively connected to the carriage by suitable linkage 63. The indexing shaft 62 is driven from the motor 54 through means including a friction clutch 64, and a solenoid actuated ratchet type brake means 66 is selectively actuated to stop the indexing shaft 62 and the carriage 38 at different positions to align selected wires 21 of the article 22 in welding position in the path of the electrode 40.

A pre-selector control mechanism 68 is provided including two sets of switches 69 and 70 (Fig. 11) settable to various positions to set up various control circuits to effect in a predetermined sequence: (1) the operation of the brake 67 to effect the selective indexing of the carriage 38 through different distances to position selected wires 21 of the article 22 in welding position in alignment with the electrode 40, (2) the selection of the desired type of tapes 26–A, 26–B, 26–C to be fed for forming the contacts 20 to be welded onto the succeeding selected wires 21 of the article 22, (3) the tripping of the one-revolution clutch 55 and the rotation of the main drive shaft 50 to effect the welding of the contacts 20 onto the selected wires 21 of the article, the feeding of the tapes 26, the cutting of contacts 20 therefrom, and the transfer of the contacts to the electrode 40, and (4) the tripping of the one-revolution clutch 58 and the rotation of the shaft 57 to effect the removal of the finished article 22 from the carriage 38 and the feeding of an unfinished article 22 thereonto by the conveyor 36.

More specifically, the articles 22 are supported on a pair of rails 75 and 76 of the conveyor 36 (Figs. 1, 3, and 7), which are supported on brackets 77. The rail 75 engages the wires 21 between the blocks 23 and 24 of the article 22 and serves to prevent displacement of the article longitudinally of the wires 21. The articles 22 are advanced by feed pawls 79 carried on a reciprocable feed bar 80, which is supported by a plurality of rollers 81 riding in slots 82 in the feed bar. The rollers 81 are mounted on elongated stationary frame members 83 which are supported by brackets 84 on the base plate 34. Reciprocation is imparted to the feed bar 80 by the cam 59 through the linkage 60 which is in the form of a lever 87 fixed to a vertical shaft 88 and connected to the feed bar 80, and a second lever 89 (Figs. 2 and 7) fixed to the shaft 88 and actuated by the cam 59.

The carriage 38 is mounted for horizontal reciprocable movement on the ways 93 of a supporting block 94 secured to the base plate 34. Mounted on the carriage for horizontal movement therewith is a holder 96 which is guided for limited vertical movement on the carriage by guide members 97 and is urged upwardly by a spring 98 to its normal upper position (Fig. 3) level with the rails 75 of the conveyor 36 for receiving an article 22 as it is advanced by the conveyor. The rails 75 and 76 are each formed in two sections which are spaced apart to provide clearance for the horizontal movement of the holder 96 as the carriage 38 is indexed. A hold down or clamping member 101 is mounted on the carriage 38 for horizontal movement therewith and for vertical movement relative thereto for clamping the article 22 onto the holder 96 and moving the article and the holder to a lower operative position with the first wire 21 of the article in alignment with the electrode 40. A slotted guide 99 on the carriage 38 (Fig. 6) engages the ends of the wires 21 of the article 22 to accurately position them on the carriage and a shoulder 100 on the holder 96 engages the end of the block 24 of the article 22 to support it against the impact of the electrode 40. The clamping member 101 is fixed to a pair of vertically disposed rods 102 which are slidable in tubular guides 103 on the carriage 38 and have a cross bar 104 secured to their lower ends below the base plate 34. Springs 105 encircling the rods 102 stress the bar 104 and the clamping member 101 for downward movement to clamp the article 22 on the holder 96 and to move them to their lower operative position. The clamping member 101 is moved upwardly by a lever 109 which is pivoted at 110 and is actuated by a cam 107 on the shaft 57 and which has a roller 111 engageable with the cross bar 104.

The welding electrode 40 (Fig. 6) is supported for horizontal reciprocable movement in a U-shaped member 124 secured to the base plate 34 and is stressed for forward movement toward the carriage by a spring 125 mounted on the member 124. A cam follower 126 formed on one end of the welding electrode 40 engages the internal cam surface 127 of a cam 128 on the shaft 50 and the cam 128, in cooperation with the spring 125, moves the electrode 40 to a loading position where a contact 20 is inserted in the recess 47 of the electrode by a transfer member 129 of the contact transfer mechanism 45. The electrode 40 is then backed off a little by the cam and advanced to cause the contact to bump against the transfer member and be firmly seated in the electrode after which the transfer member is retracted and the electrode is advanced to a predetermined position and released, causing the spring 125 to rapidly advance it and carry the contact 20 therein into engagement with the end of the wire 21 with an impact to cause the contact 20 to be percussively welded to the end of the wire 21.

An electronic device 133 (Fig. 6) for supplying welding current is connected by a conductor 134 to the electrode 40, and by a conductor 135 to a brush 136 which is moved into engagement with the end of the wire 21 in alignment with the electrode 40 to supply welding current thereto, whereby when the contact 20 approaches the wire 21, an arc is produced which fuses the adjacent surfaces of the contact 20 and the wire 21 to weld them together as the contact is thrust against the wire. The brush 136 is mounted on the upper end of a rod 138 which is guided for vertical movement in a tubular guide 139 secured to the base plate 34. A spring 140 engaging the enlarged head 141 of the rod stresses the rod 138 and the brush 136 downwardly to move the brush into engagement with a wire 21 and clamp it against an anvil 142 on the carriage to establish a good electrical connection with the wire 21. The brush 136 is raised by a bell crank lever 143 (Fig. 2) pivoted at 144 and actuated by a cam 145 on a shaft 146. This shaft is journalled in bearings 147 and is driven from the drive shaft 50 through a pair of spiral gears 148 (Figs. 1 and 7).

The shaft 146 also actuates the tape feeding mechanism 41 and has an actuating member or cam 154 splined thereon for individually actuating levers 155 (Figs. 7 and 8) of three tape feeding devices, one for each of the three types of tapes 26. These levers 155 are pivotally supported on a pin 156 in a suitable frame 157 and have arms 158 pivotally connected thereto. The arms 158 engage the upper portion of the tapes 26 and cooperate with arms 159 pivotally supported on a pin 160 and engageable with the underside of the tape. Leaf springs 161 and 162 secured to the frame 157 move the levers 155 and the arms 159 to normal retracted positions in engagement with stops 163 and 164, respectively. As the cam 154 rotates, it actuates the lever 155 of the tape feeding device aligned therewith and causes the arm 158 thereof to grip the tape 26 against the arm 159 and advance the tape a predetermined distance into the tape shearing mechanism 42. The tapes 26 which are guided in suitable guideways 163 in the frame 157 are held against return movement by pivoted holding pawls 174.

The cam 154 has a hub portion 164 splined on the shaft 146 (Fig. 7) and the cam is shiftable into alignment with each of the three tape feeding devices by a shifting yoke 168 which is pivotally supported at 169 and has an integral actuating lever 170. This lever is pivotally connected to one end of a pair of interconnected cores 171 and 172 of a pair of solenoids 173 and 174 suitably mounted on the base plate 34. The actuating cam 154 is yieldably maintained by springs 175 in a normal middle position in alignment with the lever 155 of the middle one of the three tape feeding devices, and the cam 154 may be shifted to either side in alignment with the adjacent levers 155 by selective energization of the solenoids 173 and 174.

A pair of spaced lugs 176—176 (Figs. 7 and 8) formed on a block 177 secured to the frame 157 and having beveled ends 178, cooperate with a finger 179 on the hub of the cam 154 to guide the cam into three predetermined positions in accurate alignment with each of the selected tape feeding devices. This guide means supplements the cam shifting means to accurately position the cam 154 in its three positions to prevent more than one tape 26 being fed and more than one contact being formed at one time.

The tapes 26 are fed individually into apertures 180 in a die 181 (Fig. 5) of the tape shearing mechanism 42 and a punch 182 having a notch in the end thereof is actuated by a cam 183 on the shaft 50 to shear a contact from the tape and carry it in the notch into the path of the transfer member 181 which transfers the contact from the punch into the recess 47 of the electrode 40. The transfer member 181, which has a notched end for receiving the contact 20 sheared from the tape, is mounted for sliding movement in a suitable guideway and is connected to a lever 184 (Fig. 8) fixed to a shaft 185 which has a lever 186 engageable with a cam 187 (Fig. 1) on the main drive shaft 50 for actuating the transfer mechanism.

From the description thus far it will be seen that the welding electrode 40, the tape feeding mechanism 41, the tape shearing mechanism 42, and the contact transferring mechanism 45 are actuated in a predetermined sequence by the main drive shaft 50 so that in response to one complete revolution of the shaft 50 the electrode 40 is actuated to effect the welding of a contact 20 onto a wire 21 of the article 22, the tape feeding mechanism feeds a selected one of the three tapes a predetermined distance into the shearing mechanism, the shearing mechanism shears a contact therefrom, and the transfer mechanism transfers it to the welding electrode preparatory to welding it onto the next selected wire 21 of the article 22 during the next cycle of operation of the shaft 50.

The one-revolution clutch 55 (Figs. 1 and 7) through which the shaft 50 is rotated, has a driving element which is connected through a sprocket and chain connection 189 to a shaft 190 of a gear reducer 191 which is driven from the motor 54. The clutch 55 has a control member 193 provided with a shoulder which is adapted to be engaged by a trip lever 194 for actuating the clutch to disengage its driving connection with the shaft 50. The trip lever 194 is pivotally supported at 195 on the base plate 34 and has a depending portion connected to the core of a solenoid 196 for disengaging the lever from the member 193 to effect a driving connection between the clutch and the shaft 50. A spring 197 urges the lever 194 into engagement with the periphery of control member 193 to engage the shoulder thereon and thereby disengage the clutch to stop the shaft 50 after one revolution.

The shaft 57 for actuating the conveyor 36 is rotatable independently of the shaft 50. A driving member of the clutch 58 (Figs. 1, 2, and 7) is connected through a chain and sprocket connection 201 to the shaft 190 of the gear reducer 191. A control member 203 of the clutch 58 has a shoulder which is adapted to be engaged and actuated by a trip lever 204 to disconnect the drive and stop the shaft 57 after one revolution. The lever 204 is pivotally supported at 205 on a bracket 206 secured to the underside of the base plate 34 and an extension 207 of the lever 204 is connected to the core of a solenoid 208 which may be energized to disengage the lever 204 from the control member 203 to establish a driving connection with the shaft 57. A spring 209 returns the lever 204 and yieldably maintains it in engagement with the control member 203.

The indexing shaft 62 (Fig. 4) is supported in bearings 220 and is driven through the friction clutch 64. The driving element 221 of this clutch is secured to a spiral gear 222 which meshes with and is driven by a spiral gear 223 secured to the shaft 190 of the gear reducing unit 191. The indexing cam 61 on the shaft 62 is provided with eight sloping surfaces and eight concentric dwell surfaces 225 which, in cooperation with the linkage 63, move the carriage successively to the eight predetermined positions and locate successive wires 21 of the article 22 in welding position in alignment with the electrode 40. The linkage 63, as shown herein (Figs. 2 and 3), is in the form of a bell crank lever 226 pivotally supported at 227 on the base plate 34 and connected by a link 228 to the carriage 38. A spring 229 stresses the carriage 38 for movement to the left as viewed in Fig. 3 and cooperates with the cam 61 to return the carriage to its first position.

The brake means 66 for stopping the shaft 62 and the indexing cam 61 at selected positions comprises a ratchet disc 231 fixed to the shaft 62 and a selectively actuatable latch 232. The ratchet disc 231 has eight teeth corresponding to the number of wires 21 on the article 22 and arranged in angularly spaced relation to each other corresponding to the dwell surfaces 225 of the cam 61. The latch 232, which is pivotally supported intermediate its ends at 233, is urged into engagement with the ratchet disc by a spring 234 and is actuated by a solenoid 235 to release the ratchet disc and effect the rotation of the shaft 62 and the indexing of the carriage 38.

From the description thus far, it will be seen that the indexing shaft 62 for effecting the indexing of the carriage 38 from the first position successively through all eight positions and back to the first is driven through a friction clutch 64 from a continuously running motor 54 and that the shaft 62 and the carriage 38 may be stopped at selected positions by brake means in the form of a ratchet disc 231 and a latch 232. It will also be seen that when weld solenoid 196 is energized and the one-revolution clutch 55 is tripped, the weld shaft 50 makes one complete revolution and actuates components of the apparatus to effect the welding of a contact 20 onto a wire 21 in welding position, the feeding of a selected tape 26, the shearing of a contact 20 from the tape, and the transfer of contact to the welding electrode 40. After the welding of the selected contacts onto the selected wires of the relay part has been completed, the solenoid 208 is energized, tripping the clutch 58 and causing the shaft 57 to rotate through one revolution to actuate other components of the apparatus for effecting the raising of the hold down member 101, the holder 96 on the carriage, and the article 22 thereon to an upper level in alignment with the conveyor 21, for effecting the transfer of the finished relay part from the carriage and the feeding of an unfinished relay part onto the carriage as the carriage is returned by the indexing mechanism to its first position, and for effecting the lowering of the hold down member 101, the holder 96, and the article 22 supported thereon to the lower level in operative position and with the first wire 21 of the relay part in alignment with the welding electrode 40.

In Fig. 11 the schematic wiring diagram of the preselector mechanism is shown with its sets of welding switches 69 and tape selector switches 70 which may be set in different patterns to control the operation of the apparatus to selectively weld any of the three types of contacts onto selected wires 21 of the articles 22. There are eight welding switches 69–1 to 69–8 and eight tape selector switches 70–1 to 70–8, one for each wire 21 of the relay part 22, and these two sets of switches are mounted on a suitable panel in a position convenient for the operator to actuate for setting up the desired combination. The switches 69 are of the three-pole double throw toggle type, and these poles of each switch 69 form three separate switch components designated 69–1a, 69–1b, 69–1c to 69–8a, 69–8b, and 69–8c. Switch 69–1 has an extra pole designated 69–1d. The switches 69–1a to 69–8a are connected to segments of a commutator 242, the switches 69–1b to 69–8b are connected to segments of a commutator 243, the switches 69–1c to 69–8c are connected to segments of a commutator 244, and the switch 69–1d is connected to the single segment of a commutator 245. The welding switches 69 are movable individually from a first or "no-weld" position to a second or "weld" position, in which latter position the poles 69–1a to 69–8a engage contacts 261, and these contacts are electrically connected to the solenoid 196 which trips the one-revolution clutch 55 of the contact welding and forming shaft 50 when energized.

The commutator 242 is stationarily mounted on the base plate 34 and the segments thereof are arranged in a row and are adapted to be successively engaged by a brush 247 on the carriage 38 as the carriage is indexed to its eight different positions. The commutators 243, 244, 245, and another commutator 248 are stationarily supported in concentric relation to the shaft 62 by a bracket secured to the base plate 34 and have brushes 250, 251, 252, and 253, respectively, mounted on the shaft 62 for rotation therewith. The brushes 250 and 253 are connected to a line 255 of a pair of electrical power lines 255—256, and the brushes 247, 251, and 252 are connected to the line 255 through a switch 257. This switch is actuated by a cam 258 mounted on the article transferring shaft 57 and is held in a normally closed position when the shaft is not rotating. The apparatus may be set into operation by pressing a start button 259 to energize relay 260 which starts motor 54 and locks itself in.

The tape selector switches 70 are associated with the poles 69–1c to 69–8c of the switches 69 which are electrically connected to the segments of the commutator 244. The poles 69–1c to 69–8c of the switches 69 engage contacts 264 when the switches 69 are in their "no-weld" position and engage contact terminals 265 when the switches are set in their "weld" position. The contacts 265 are individually connected to the tape selector switches 70–1 to 70–8 which are movable into three positions, 70–A, 70–B, and 70–C, corresponding to the types of contacts it is desired to have welded to the wires 21 of the article 22. In positions 70–A the switches 70 are electrically connected to the solenoid 173 for shifting the tape feed actuating cam 154 into position for feeding tape 26A, and in positions 70–C the switches 70 are electrically connected to the solenoid 174 for shifting the tape feed actuating cam into position for feeding tape 26C. In positions 70–B the switches 70 are connected to neither of the solenoids 173 and 174 and the cam 154 remains in its normal position for feeding the tape 26B. The solenoids 173 and 174 are connected to the line 256 through a normally open switch 267 which is closed by a cam 268 on the shaft 50 during the actuation of the tape feeding means.

The first segment of the commutator 244 is connected to the second switch 69–2c, the second commutator segment is connected to the third switch 69–3c, and so on, as indicated in Fig. 11, and conductors or jumpers 269 connect each of the contacts 264 of one switch pole to the switch pole adjacent thereto. Thus, in each of the selected positions of the carriage and during each rotation of the shaft 50 the contact in the welding electrode 40 is welded onto a wire 21 of the article 22, a selected type of contact tape is fed into the tape shearing mechanism, and a contact 20 is sheared from the tape and transferred to the electrode 40 for welding onto the next selected wire 21 of the article 22.

The pre-selector control mechanism 68 provides means including the commutator 243 and the switch poles 69–1b to 69–8b for energizing the solenoid 235 to effect the selective operation of the indexing mechanism to move the carriage 38 to and stop it at selected ones of the predetermined positions to position selected wires 21 of the article 22 in welding position. The solenoid 235 is energized through normally open contacts 272 when these contacts are closed by the energization of a slow-acting relay 273. This relay is electrically connected through normally closed contacts 274 of a fast-acting relay 275 to a plurality of contacts 276 which engage the switches 69–1b to 69–8b when the switches 69 are set in their "no-weld" positions. The poles 69–1b to 69–8b are connected to the segments of the commutator 243 as indicated in Fig. 11 with the switch 69–1b connected to the eighth segment, switch 69–2b connected to the first segment, switch 69–3b connected to the second segment, etc. The brush 250 of the commutator 243 has an enlongated arcuate wiping surface to make contact with a commutator segment before breaking with the preceding one. Thus, when the brush 250 engages a commutator segment which has the switch 69 associated therewith set to "no-weld" position, a circuit is completed from line 255, through the commutator segment, the switch 69–b associated therewith, normally closed contacts 274, relay 273, to the line 256 to energize the relay 273 and close the contacts 272 which completes a circuit through the solenoid 235, causing it to be energized and to retract the latch 232. The normally closed contacts 274 are actuated to open position by energization of the fast-acting relay 275 which is connected in parallel with the solenoid 196.

If, for example, it is desired to weld contacts 20 onto the first, second, sixth, seventh, and eighth wires of articles 22 as shown in Fig. 12, and if the contacts are to be of type B, A, C, A, and C, respectively, for the five selected wires, the switches 69–1, 69–2, 69–6, 69–7, and 69–8 are set to their "weld" positions, the other switches remaining in their "no-weld" positions, and the tape selecting switches 70–1, 70–2, 70–6, 70–7, and 70–8, are set to positions 70–B, 70–A, 70–C, 70A, and 70C, respectively, as shown in Fig. 11.

With the pre-selector control mechanism 68 thus set up and with a B-type contact 20 in the welding electrode 40, and with the carriage 38, the article 22, and the brushes 247, 250, 251, 252, 253 in their first or initial starting positions, the operation is as follows: At commutator 242 a circuit is completed through power line 255, switch 257, brush 247, the first segment of the commutator 242, switch 69–1a, solenoid 196 and relay 275 in parallel, to power line 256 to energize the solenoid 196 and the relay 275; at commutator 243, a circuit through brush 250 and the first segment of the commutator is open at switch 69–2b; at the tape selector commutator 244 a circuit through brush 251 is partially completed through the first segment of the commutator 244, switch 69–2c, switch 70–2 in position 70–A, solenoid 173 to open switch 267; at commutator 245 the circuit through brush 252 is open at switch 69–1d; and at commutator 248 no circuit is established through brush 253. In response to the energization of the relay 275 at the commutator 242, the contacts 274 are opened, thereby preventing energization of relay 273. In response to energization of the solenoid 196 the clutch 55 is tripped, causing the shaft 50 to rotate through one revolution, which (1) actuates the welding electrode 40 to effect the welding onto the first wire 21 of the article 22 of the B-type contact 20 carried by the electrode, (2) causes the cam 268 to close switch 267 to energize solenoid 173 for shifting the tape selector actuating cam 154 into "A" position, for feeding tape 26-A, (3) actuates the tape feeding mechanism to feed the tape 26A a predetermined distance, (4) actuate the tape shearing mechanism to shear a contact 20 therefrom, (5) actuate the contact transfer mechanism to transfer the contact 20 to the welding electrode 40, and (6) cause the cam 262 to close indexing switch 263. With the closing of the switch 263 the solenoid 265 is energized and the latch 232 is retracted from the first tooth of the ratchet disc 231, causing the indexing shaft 62 to rotate and the carriage 38 to be advanced. As the brush 247 is moved from the first segment of the commutator 242, the solenoid 196 and relay 275 are deenergized, and as the cam 262 opens the switch 263 after a short interval, the solenoid 235 is deenergized, causing the latch 232 to drop onto the upper peripheral surface of the first tooth of the ratchet disc 231 and engage the second tooth thereof to stop the shaft 62 with the brushes 247, 250, 251, 252, 253, the carriage 38, and the article 22 in the second position.

In the second position, the brush 247 engages the second segment of the commutator 242 and since switch 69-2 is set in "weld" position, a circuit is completed through the solenoid 196 and the relay 275, energizing them and causing the clutch 55 to be tripped and the shaft 50 to rotate through one revolution, and causing the normally closed contacts 274 to open. The brush 251 in second position engages the second segment of the commutator 244 which is connected to switch 69–3c, and since this switch is set in "no-weld" position in engagement with the contact 264 thereof, and since the switches 69–4c and 69–5c are likewise in their "no-weld" positions, they likewise are in engagement with the contacts 264 thereof, and since these contacts are electrically connected to the following switches by jumpers 269, a circuit is completed from line 255, switch 257, brush 251, commutator 244, switch 69–6c, switch 70–6, in position 70–C, solenoid 174 to switch 267. When switch 267 is closed by the cam 268 on the shaft 50 a circuit is completed to energize the solenoid 174 and cause it to shift the tape selector actuating cam 154 into position for feeding tape 26–C. The rotation of the shaft 50 will effect the welding of the type "A" contact 26 in the electrode 40 onto the second wire 21 of the article 22, the forming and feeding of a "C" type contact to the electrode 40, and the closing of the switch 263 by the cam 262, thereby effecting the energization of the solenoid 235, the withdrawal of the latch 232 from the second tooth of the ratchet disc 231, and the indexing of the carriage.

In the second position of the apparatus the brush 250 engages the second segment of commutator 243 and is electrically connected with switch 69–3b which is in "no-weld" position in engagement with the contact 276 thereof and is connected through contacts 274 to the slow acting relay 273, but before the slow acting relay 273 can become energized to close contacts 272 thereof, the contacts 274 are opened by energization of the fast acting relay 275. However, as the carriage begins its indexing movement after the second contact 20 has been welded to the second wire 21 of the article 22, the brush 247 is moved away from the second segment of the commutator 242 and the relay 275 is deenergized, causing the contacts 274 to close, thus completing a circuit through the relay 273 which is thereby energized and closes indexing contacts 272. The closing of the contacts 272 serves to maintain the solenoid 235 energized after the switch 263 is opened by the cam 262. With the solenoid 235 energized and the latch 232 withdrawn from the ratchet disc 231, the indexing shaft 62 continues to rotate, indexing the brushes and the carriage into and past the third position, in which position the brush 247 momentarily engages the third segment of the commutator 242 in passing but completes no circuit therethrough since the switch 69–3a is in "no-weld" position. As the brush 250, which has an extended wiping surface thereon and is of the make-before-break type is moved from the second segment of the commutator 243 onto the third segment, it serves to complete and maintain a circuit through the switches 69–3b, 69–4b, contacts 274, and relay 273 to keep this relay energized and the contacts 272 closed, thereby maintaining the solenoid 235 energized and the latch 232 retracted, thus allowing the indexing shaft 62 to continue rotating past the third position. Since the switches 69–3, 69–4, 69–5 are set to "no-weld" positions, the commutators 242 and 243 cooperate to maintain the indexing solenoid 235 energized and the latch 232 retracted while the shaft 62 rotates to effect the indexing of the carriage 38 from the second to the sixth position with a substantially continuous movement. As the brush 247 momentarily engages the fourth and fifth segments of the commutator 242 in passing no circuit is completed through the relay 275 to energize it and open the contacts 274 to effect the stopping of the indexing shaft 62.

As the brush 250 engages the fifth segment of the commutator 242 and disengages from the fourth segment, the circuit to the relay 273 is broken at switch 69–5b, and the solenoid 235 is thereby automatically deenergized, allowing the latch 232 to drop into engagement with the upper surface of the fifth tooth of the ratchet disc 231, whereby the indexing shaft 62 continues rotating until the latch 232 engages the sixth tooth and stops the shaft 62 with the brushes, the carriage 38, and the article 22 in the sixth position.

The brush 251 engaging the sixth segment of the commutator 244 completes a circuit through switch 70–7 in position 70–A to the solenoid 173 which is energized when switch 267 is closed by the cam 268 and the tape feed actuating cam is shifted thereby to the position for feeding tape 26A. The brush 247 completes a circuit through the sixth segment of the commutator 242, switch 69–6, solenoid 196, and again actuates the one-revolution clutch 55 to cause the rotation of the shaft 50 and effect the welding of the contact 20–C in the electrode 40 onto the sixth wire 21 of article 22, the feeding of tape 26A, the shearing of a contact 20–A therefrom, the transfer of the contact to the electrode 40, and the momentary closing of the indexing switch 263 by the cam 262.

With the closing of the switch 263 the solenoid 235 is energized and retracts the latch 232 from the sixth tooth of the ratchet disc 231, thereby causing the carriage to advance and when the switch 263 opens, the solenoid 235 is deenergized, allowing the latch 232 to drop on the peripheral surface of the sixth tooth of the ratchet disc 231 and engage the seventh tooth thereof to stop the indexing shaft 62, the brushes, the carriage, and the article 22, in the seventh position. With the carriage, the article 22, and the brushes in seventh position circuits are completed to effect the welding of the contact 20–A in the electrode 40 to the seventh wire 21 of the article 22, the selection and feeding of contact tape 26–C, the shearing of contact 20–C therefrom, and the transfer of the contact to the electrode 40. As the shaft 50 rotates, the cam 262 thereon again closes the indexing switch 263 to energize the relay 235, thus momentarily retracting the latch 232 and causing the indexing mechanism to advance the carriage, relay part, and the brushes to the eighth position. In this position circuits are completed to effect the welding of the contact 20–C carried by the electrode 40 to the eighth wire of the article 22, the selection and feeding of contact tape 26–B, the shearing of contact 20–B therefrom, and the transfer of the contact into the electrode 40. The latch 232, when released, drops onto the peripheral surface of the eighth tooth of the ratchet disc 231 and as the shaft 62 continues to rotate, the cam 61 and the spring 229 return the carriage 38 to its first position where it is stopped by the engagement of the latch with the first tooth of the ratchet disc.

After the contact 20–C has been welded onto the eighth wire of the article 22 and the shaft 62 starts to rotate, the brush 253 of the commutator 248 engages the single segment 262 of the commutator 248 and completes a circuit through the solenoid 208 to energize it and trip the clutch 58. This causes the shaft 57 to rotate through one revolution and effect the raising of the hold down member 101, the holder 96, and the finished article 22 to their upper position, the actuation of the conveyor 36 to remove the finished article from the carriage 38 and to feed an unfinished article 22 onto the carriage and to lower the hold down member 101, the holder 96, and the article 22 to the lower level with the first wire 21 thereof in welding position in alignment with the electrode 40.

The commutator 245 is provided with its single segment disposed in the first position and connected to the switch 69–1b so that when the welding apparatus is set up to process articles 22, on the first wires 21 of which no contacts 20 are to be welded, and the switch 69–1 is set to "no-weld" position, a circuit will be completed through the brush 252, the switch 69–1d, and the solenoid 235 to energize the solenoid and withdraw the latch 232 and cause the carriage 38 to be indexed to the second position.

It is to be understood that the above-described arrangements are simply illustrative of the application of the principles of this invention. Numerous other arrangements may be readily devised by those skilled in the art which will embody the principles of the invention and fall within the spirit and scope thereof.

What is claimed is:

1. In an apparatus for selectively welding contacts onto conductors of an article, means for supporting the article for movement in a predetermined path through a plurality of predetermined operative positions to dispose successive conductors in a welding position, continuously operating indexing means including a yieldable element for moving the article supporting means with a substantially continuous movement from the first to the last of said operative positions and permitting the article supporting means to be intermittently stopped and started, means for stopping the article supporting means at said operative positions to dispose successive conductors of the article in a welding position, means for welding contacts onto the conductors of said article at said welding position, and control means including a plurality of switches settable to different positions for establishing various control circuits in response to movement of the article supporting means successively to said operative positions for selectively rendering said stopping means operable to stop the article supporting means for predetermined intervals at selected operative positions and for rendering the welding means operable during said intervals to effect the welding of contacts onto selected conductors of the article.

2. In an apparatus for selectively welding contacts onto conductors of an electrical component, a holder for supporting the electrical component, a rotatable cam for advancing the holder into a plurality of predetermined operative positions for locating successive conductors of the electrical component in a welding position, continuously operative means including yieldable clutch means for rotating said cam and permitting it to be intermittently stopped and started, means for stopping the cam in a plurality of predetermined positions to locate the holder in said operative positions, means for welding contacts onto the conductors of said electrical component in the welding position, and control means including a plurality of switches settable to different positions for establishing various control circuits in response to movement of the holder to successive operative positions for selectively rendering the stopping means operable to stop the holder for predetermined intervals in selected operative positions and for rendering the welding means operable to weld contacts onto the selected conductors during said intervals.

3. In an apparatus for welding contacts onto conductors of an electrical component, a holder for supporting the electrical component for movement in a predetermined path, a shaft, a cam on said shaft for advancing the holder and the electrical component through a predetermined path, a continuously operative drive means including a slip clutch for rotating the shaft and permitting it to be intermittently stopped and started, a stop member mounted on said shaft and having a plurality of teeth corresponding in number to the conductors on the electrical component, a latch engageable with the teeth of the stop member for stopping the shaft and the holder in said operative positions to locate successive conductors of the electrical component in a welding position, means for actuating said latch to move it into and out of engagement with the stop member, means for welding contacts onto the conductors of the electrical component in the welding position, means for feeding contacts to the welding means, means for actuating the welding means, and control means including switch means for each of the conductors settable to different positions for establishing various control circuits in response to movement of the holder and the electrical component to successive operative positions for selectively rendering said latch actuating means operable to stop the holder for predetermined intervals at selected operative positions and for rendering said contact feeding means and said contact welding means operative to feed contacts to said welding means and to weld the contacts onto the selected conductors of the electrical component during said intervals.

4. In an apparatus for selectively welding contacts onto conductors of an electrical component, a holder for supporting the electrical component for movement in a predetermined path; a rotatable cam for advancing the holder into a plurality of predetermined operative positions for locating successive conductors of the electrical component in a welding position; continuously operating means including a yieldable clutch for rotating said cam and permitting it to be intermittently stopped and started; means for stopping the cam with the holder in said operative positions to dispose the conductors on the electrical component successively in the welding position; means for welding contacts onto the conductors of the electrical component in welding position; means for feeding a contact tape; means for shearing a contact from the tape; means for transferring the contact to the welding means; actuating means for actuating the welding means to weld a contact onto said article, for actuating the tape feeding means to feed a tape a predetermined distance, for actuating the tape shearing means to shear a contact from the tape, and for actuating the transferring means to transfer the contact to the welding means; and control means including switch means for each of the conductors of the electrical component settable to different positions for establishing various control circuits in response to movement of the holder to said predetermined positions for selectively rendering said stopping means operable to stop the holder for predetermined intervals at selected ones of said predetermined positions and for rendering said actuating means operable in timed relation to the stopping of the holder at the selected operative positions to effect the feeding of the tape, the shearing of contacts therefrom, the transfer of the contacts to the welding means, and the welding of the contacts onto the selected conductors of the electrical component.

5. In an apparatus for forming and selectively welding contacts onto conductors of an electrical component, a holder for supporting the component; a rotatable cam for advancing the holder from a first operative position to a plurality of other operative positions and back to its first position; continuously operating means including a yieldable clutch for rotating the cam and permitting it to be intermittently stopped and started; means for stopping the cam and the holder in said operative positions for predetermined intervals to position successive conductors of the electrical component in a welding position; means for welding contacts onto the conductors of the electrical component in the welding position; means for feeding a contact tape; means for shearing contacts from the tape; means for transferring the contacts to the welding means; actuating means for actuating said welding means to weld a contact onto said article, for actuating said feeding means to feed a tape, for actuating said tape shearing means to shear a contact from the tape, and for actuating the transfer means to transfer the contact to the welding means in a predetermined sequence; conveyor means for removing the electrical component with the contacts welded thereon from the holder after the holder has been moved to its last operative position and for feeding another electrical component onto the holder after the holder has been returned to its first operative position; and control means including a plurality of switch means corresponding to the number of conductors on the electrical component and settable to different positions to establish various control circuits in response to movement of the holder successively to said operative positions for selectively rendering said stopping means, said actuating means, and said conveyor means operable in a predetermined sequence to effect the stopping of the holder in selected ones of the operative positions, to effect the feeding of a tape, the shearing of a contact therefrom, the transfer of the contact to the welding means, and the welding of the contact onto the conductor of the electrical component each time the holder is stopped at one of said operative positions, and to effect the transfer of the article from the holder after the holder has been moved to its last operative position and the transfer of another article onto the holder after the holder has been returned to its first operative position.

6. In an apparatus for selectively forming and welding contacts onto conductors of an electrical component, a holder for supporting the electrical component for movement in a predetermined path; a rotatable cam for advancing the holder and the electrical component through predetermined operative positions to locate successive conductors of the electrical component in a welding position; a continuously operating drive means including a slip clutch for rotating the cam and permitting it to be intermittently stopped and started; a stop member mounted for rotation with the cam and having a plurality of teeth corresponding in number to the conductors on the electrical component; a latch engageable with the teeth of the stop member for stopping the indexing shaft in predetermined positions to effect the stopping of the holder in the operative positions; means for actuating the latch to move it into and out of engagement with the stop member; means for welding contacts onto the conductors of the electrical component in the welding position; a plurality of tape feeding devices for feeding individual tapes of different kinds; an element shiftable into a plurality of predetermined positions for actuating the tape feeding devices individually; means for shifting the tape feed actuating element into said predetermined positions; means for shearing contacts from said tapes; means for transferring the contacts to the welding means; actuating means for actuating said welding means to weld a contact onto said electrical component, for actuating said tape actuating member to feed a selected tape, for actuating said tape shearing means to shear a contact from the tape, and for actuating said transferring means to transfer the contact to said welding means in a predetermined sequence; and control means including a plurality of manually settable switches for establishing various control circuits in response to movement of the holder to successive operative positions for selectively rendering the latch actuating means, the element shifting means, and the actuating means operable in a predetermined sequence to effect the selective stopping of the holder at selected operative positions, to effect the selective shifting of the tape feed actuating element to selected predetermined positions in timed relation to the stopping of the holder at selected operative positions, and to effect the feeding of a tape, the shearing of a contact, the transfer of the contact to the welding means, and the welding of the contact to a conductor of the electrical component in timed relation to the stopping of the holder at selected operative positions.

7. In an apparatus for selectively welding contacts onto conductors of an electrical component, a holder for supporting an electrical component, a rotatable cam for advancing the holder into a plurality of predetermined operative positions for locating successive conductors of the electrical component in a welding position, continuously operating means including a yieldable clutch for rotating said cam and permitting it to be intermittently stopped and started, means for stopping the cam in a plurality of predetermined positions, a welding electrode for supporting a contact, means for feeding contacts to the welding electrode, means for electrically connecting the welding electrode and the conductor aligned therewith to a device for supplying welding current thereto, means for actuating said welding electrode to move the contact into impact engagement with the conductor of the electrical component in the welding position to effect the percussive welding of the contact to the conductor, and control means including a plurality of switches settable to different positions for establishing control circuits in response to movement of the holder to successive operative positions for selectively rendering the stopping means operable to stop the article holder for predetermined intervals in selected positions and for rendering said feed means operable to feed contacts to said welding electrode and the actuating means operable to weld contacts onto the selected conductors during said intervals.

8. In an apparatus for selectively welding contacts onto predetermined elements of an article, means for moving said article in a substantially continuous movement through a predetermined path to move successive elements of the article into a welding position, means for stopping the article moving means at a plurality of predetermined position to locate successive elements of the article in the welding position, means for welding a contact onto an element of the article in the welding position, selectively operable control means responsive to movement of the article moving means to said predetermined positions for rendering said stopping means operable to stop the article moving means at selected predetermined positions to locate selected elements of the article successively in the welding position and for rendering said welding means operable when the article moving means is stopped at said selected predetermined positions to effect the welding of contacts onto said selected elements, and means responsive to the operation of said welding means for rendering said stopping means inoperative and said article moving means operative to move the article.

9. In an apparatus for welding contacts onto selected elements of an article, a carriage for supporting an article, a rotatable cam capable of moving said carriage through a predetermined path in a substantially continuous motion, means including a slip clutch for rotating said cam, a stop member, a member rotatable with said cam and having a plurality of stop surfaces cooperable with said stop member for stopping the cam and the carriage in a plurality of predetermined positions to locate successive elements of the article in a welding position, means for welding contacts onto the elements of the article in the welding position, control means for each of said predetermined positions of the carriage selectively settable to first and second positions and effective in said first positions to render the stop member operative to engage the stop surfaces of said rotatable member and stop the carriage in selected predetermined positions and to render said welding means operative to weld contacts onto selected elements of the article when said carriage is stopped in said predetermined positions and said control means being effective in said second positions to render said welding means inoperative to weld a contact and to render said stop means inoperative to stop the rotatable member and the carriage, and means operable in response to the actuation of said welding means for disengaging the stop member from the stop surface of said rotatable member to effect the movement of the carriage.

10. In an apparatus for selectively welding contacts onto elements of an article, means for supporting the article for movement in a predetermined path through a plurality of predetermined operative positions to dispose successive elements of the article in a welding position, drive means including a yieldable connection for moving the article supporting means in a substantially continuous movement through said predetermined operative positions, means for stopping the article holding means at the operative positions, a welding mechanism for welding contacts onto the elements of the article at the welding position, a plurality of circuits individual to said predetermined positions of the article supporting means, means for energizing said circuits sequentially in response to movement of the article supporting means to said predetermined positions, switch means in said circuits selectively settable to first and second positions and effective in said first position for rendering the stopping means and the welding means operative to stop the article supporting means at selected operative positions and to weld contacts onto the selected elements of the article and effective in the second position for rendering the stopping means and the welding means inoperative, and means operable in response to actuation of the welding mechanism for rendering the stopping means inoperative.

11. In an apparatus for selectively welding contacts onto elements of an article, a holder for supporting the article, a rotatable cam for advancing the article holder with a substantially continuous movement into a plurality of predetermined operative positions for locating successive elements of the article in a welding position, drive means including a yieldable connection for rotating said cam, means for stopping the cam in a plurality of predetermined positions to locate the article holder in the operative positions, means for welding the contacts onto the elements of the article in the welding position, a plurality of control circuits individual to said predetermined positions of the article holder, means for rendering said circuits operative sequentially in response to movement of the article holder to the said predetermined positions, and switch means in said circuits selectively settable to first and second positions and effective in said first position to render the stopping means and the welding means operative to stop the holder for predetermined intervals in selected operative positions and to weld contacts onto the selected elements of the article during said intervals and effective in said second position to render the stopping means and the welding means inoperative.

12. In an apparatus for selectively welding contacts onto predetermined elements of an article, means for moving an article in a substantially continuous movement through a predetermined path to move successive elements of the article into a welding position, means for stopping the article moving means at a plurality of predetermined positions to locate successive elements of the article in the welding position, means for welding contacts onto an element of the article in a welding position, a plurality of control circuits individual to the said predetermined positions of the article moving means, means for sequentially energizing said circuits in response to movement of said article moving means to said predetermined positions, and switch means in said circuits selectively settable to first and second positions and effective in said first position for rendering said stopping means and said welding means operative to stop the article moving means at selected predetermined positions for predetermined intervals and to weld contacts onto the elements during said intervals and effective in said second position to render said stopping means and said welding means inoperative.

References Cited in the file of this patent

UNITED STATES PATENTS 2,668,219   Sandberg _____ Feb. 2, 1954